(12) United States Patent
Somaraju et al.

(10) Patent No.: US 11,019,045 B2
(45) Date of Patent: May 25, 2021

(54) SECURE GROUP COMMUNICATION

(71) Applicants: TRIDONIC GMBH & CO KG, Dornbirn (AT); PHILIPS LIGHTING HOLDING B.V., Eindhoven (NL); ARM LTD, Cambridge (GB)

(72) Inventors: Abhinav Somaraju, Dornbirn (AT); Hannes Tschofenig, Cambridge (GB); Sandeep Shankaran Kumar, Eindhoven (NL)

(73) Assignees: TRIDONIC GMBH & CO KG, Dornbirn (AT); PHILIPS LIGHTING HOLDING B.V., Eindhoven (NL); ARM LTD, Cambridge (GB)

( * ) Notice: Subject to any disclaimer, the term of this patent is extended or adjusted under 35 U.S.C. 154(b) by 612 days.

(21) Appl. No.: 15/738,318

(22) PCT Filed: Jul. 6, 2016

(86) PCT No.: PCT/AT2016/060003
§ 371 (c)(1),
(2) Date: Dec. 20, 2017

(87) PCT Pub. No.: WO2017/004651
PCT Pub. Date: Jan. 12, 2017

(65) Prior Publication Data
US 2018/0167808 A1 Jun. 14, 2018

(30) Foreign Application Priority Data
Jul. 6, 2015 (EP) .................................... 15175535

(51) Int. Cl.
*H04L 29/06* (2006.01)
*H04W 4/70* (2018.01)
(Continued)

(52) U.S. Cl.
CPC ............ *H04L 63/065* (2013.01); *H04L 9/085* (2013.01); *H04L 9/0833* (2013.01);
(Continued)

(58) Field of Classification Search
CPC ..... H04L 63/065; H04L 9/0833; H04L 9/085; H04L 9/0891; H04L 63/0428;
(Continued)

(56) References Cited

U.S. PATENT DOCUMENTS 7,334,125 B1 2/2008 Pellacuru
8,850,203 B2 9/2014 Sundaram et al.
(Continued)

FOREIGN PATENT DOCUMENTS

| CN | 101150396 | 3/2008 |
|---|---|---|
| CN | 102484583 | 5/2012 |
| CN | 103098415 | 5/2013 |

OTHER PUBLICATIONS

International Search Report dated Oct. 24, 2016 in parent PCT Application PCT/AT2016/060003.
(Continued)

*Primary Examiner* — Amie C. Lin
(74) *Attorney, Agent, or Firm* — Andrus Intellectual Property Law

(57) ABSTRACT

A first plurality (201) of network nodes (120-123, 130-133) of a network (100) is associated with a first cryptographic keying material and the multicast IP address. A second plurality (202) of network nodes (120-123, 130-133) of the network (100) is associated with a second cryptographic keying material and the multicast IP address. The first cryptographic keying material has a different secret than the second cryptographic keying material.

13 Claims, 9 Drawing Sheets

(51) Int. Cl.
*H04W 12/04* (2021.01)
*H04L 9/08* (2006.01)
*H04L 29/08* (2006.01)

(52) U.S. Cl.
CPC .............. *H04L 9/0891* (2013.01); *H04W 4/70* (2018.02); *H04W 12/0401* (2019.01); *H04W 12/04031* (2019.01); *H04W 12/04033* (2019.01); *H04L 63/0428* (2013.01); *H04L 67/327* (2013.01)

(58) Field of Classification Search
CPC ............ H04L 67/327; H04W 12/0401; H04W 12/04031; H04W 12/04033; H04W 4/70
See application file for complete search history.

(56) References Cited

U.S. PATENT DOCUMENTS

| | | | |
|---|---|---|---|
| 9,191,379 B2 | 11/2015 | Falk et al. | |
| 2005/0108576 A1* | 5/2005 | Munshi | H04L 63/0464 726/4 |
| 2007/0168655 A1* | 7/2007 | Thomasson | H04L 63/0428 713/151 |
| 2007/0294525 A1* | 12/2007 | Janes | H04L 63/20 713/151 |
| 2008/0313464 A1* | 12/2008 | Fascenda | H04L 9/0844 713/171 |
| 2010/0174899 A1* | 7/2010 | Lin | H04L 9/0833 713/153 |
| 2013/0091349 A1 | 4/2013 | Chopra | |
| 2014/0241354 A1* | 8/2014 | Shuman | H04L 12/281 370/390 |
| 2015/0295905 A1* | 10/2015 | Leicher | H04L 63/08 726/4 |
| 2016/0036813 A1* | 2/2016 | Wakumoto | H04L 63/0272 713/171 |
| 2017/0150332 A1* | 5/2017 | Palanisamy | H04W 4/14 |

OTHER PUBLICATIONS

Hardjono, et al., The Multicast Group Security Architecture, JCT-VC Meeting, MPEG Meeting, 2004.
Kumar, et al., Transport-layer Multicast Security for LLNs, Mar. 2015.
Rahman, et al., Group Communication for the Constrained Application Protocol (CoAP); Oct. 2014.
Translation of China Office Action dated Mar. 18, 2020 in counterpart China Patent Application 201680039822.8.

* cited by examiner

| | Node | Gid | Sid | IP |
|---|---|---|---|---|
| 191 → | 120 | 221 | 201 | 200 |
| 191 → | 121 | 221 | 201 | 200 |
| 191 → | 122 | 222 | 201 | 200 |
| 191 → | 123 | 221,222 | 201 | 200 |
| 191 → | 130 | 231 | 202 | 200 |

182

SECURE GROUP COMMUNICATION

CROSS REFERENCE TO RELATED APPLICATIONS

The present application is the U.S. national stage application of International Application PCT/AT2016/060003, filed Jul. 6, 2016, which international application was published on Jan. 12, 2017 as International Publication WO 2017/004651 A1. The International Application claims priority to European Patent Application 15175535.2, filed Jul. 6, 2015.

TECHNICAL FIELD

Various embodiments relate to a method and the device. In particular, various embodiments relate to techniques of controlling encrypted multicast transmission of packetized data based on secrets of first and second cryptographic keying materials and further based on a multicast IP address.

BACKGROUND

The Internet of Things (IOT) leads to a communication between a large number of devices, each implementing a network node of a corresponding network. To handle the interaction of a large number of devices, point-to-multipoint communication (multicast transmission) can be a powerful tool: Here, at one point in time, a sending network node can deliver a message to a large number of receiving network nodes.

However, known techniques of multicast transmission face certain restrictions and drawbacks. E.g., for IOT applications in a constrained environment such as may be the case in the lighting domain, there is typically a need to define multiple groups of receiving network nodes. Sometimes, the number of such groups can be comparably high. On the other hand, it can be difficult to maintain routing information such as multicast IP addresses for a large groups in a constrained environment where, e.g., memory resources are limited. Additionally, secure communication where at least parts of messages exchanged between network nodes are encrypted can be preferred. Then, it can be difficult to maintain cryptographic keying material associated for several security sessions.

SUMMARY

Therefore, a need exists for advanced techniques of encrypted multicast transmission. In particular need exists for such techniques which overcome and alleviate at least some of the above-mentioned restrictions and drawbacks. In particular, need exists for such techniques which enable, both, secure encryption, as well as flexible assignment of multicast IP addresses.

This need is met by the features of the independent claims. The dependent claims define embodiments.

According to an aspect, a method is provided. The method comprises associating a first plurality of network nodes of a network with a first cryptographic keying material and a multicast IP address. The method further comprising associating a second plurality of network nodes of the network with a second cryptographic keying material and the multicast IP address. The first cryptographic keying material has a different secret than the second cryptographic keying material. The method further comprises controlling the first plurality of network nodes to execute encrypted multicast transmission of packetized data based on the secret of the first cryptographic keying material and the multicast IP address. The method further comprises controlling the second plurality of network nodes to execute encrypted multicast transmission of packetized data based on the secret of the second cryptographic keying material and the multicast IP address.

Hence, it is possible that the first plurality of network nodes and the second plurality of network nodes share the same multicast IP address. At the same time, a given network node that is not associated with the first plurality of network nodes—i.e., is not in possession of the first cryptographic keying material—may not be able to decrypt messages of the encrypted multicast transmission between the first plurality of network nodes. E.g., the first plurality of network nodes may be referred to as a first security group; the second plurality of network nodes may be referred to as a second security group. The combination of the first plurality of network nodes and the second plurality of network nodes—that share the multicast IP address—may be referred to as a multicast group. There may be further multicast groups.

The cryptographic keying material may refer to the cryptographic keys belonging to a security group, the state associated with the keys such as expired or valid, and the other security parameters related to the keys. In some scenarios, the cryptographic keying material may comprise one or more symmetric keys. A symmetric key can be used for, both, encryption and decryption of a message by the sender and the receiver. In other scenarios, the keying material may comprising public keys and private keys.

Generally, it is possible that different security groups use different cryptographic ciphers; it is also possible that different security groups use the same cryptographic ciphers. The cryptographic cipher may relate to a particular encryption/decryption algorithm that is used to encrypt/decrypt, based on a corresponding cryptographic keying material, encrypted parts of a message.

The first and second keying materials having different secrets can relate to a scenario where a network node in possession of a key to the secret of the first keying material cannot decrypt a message encrypted based on a key to the secret of the second keying material.

The encrypted multicast transmission may correspond to sending and/or receiving of messages that include the packetized data in encrypted form. E.g., the messages may be associated with datagrams or frames of a lower layer of a layered transmission protocol; while the packetized data can correspond to a higher layer of the layered transmission protocol. Thus, encryption/decryption may be executed at a higher layer of the layered transmission protocol. The routing based on the multicast IP address can be associated with a lower layer of the layered transmission protocol.

Said controlling of the first plurality of network nodes to execute the encrypted multicast transmission can comprise: sending, to each one of the first plurality of network nodes, a control message including a first symmetric cryptographic key to the secret of the first cryptographic keying material; and sending, to each one of the second plurality of network nodes, a further control message including a second symmetric cryptographic key to the secret of the second cryptographic keying material. Alternatively or additionally, said controlling of the encrypted multicast transmission can comprise: sending, to each one of the first plurality of network nodes, a control message including the multicast IP address; and sending, to each one of the second plurality of network nodes, a further control message including the IP address. The multicast IP addresses may be assigned to the network nodes by a central control unit. E.g., said sending of the control message(s) may employ point-to-point (unicast) or multicast transmission; it is possible that said sending of the control message employs a specific control interface of the network. Alternatively or additionally, it is possible that the control message is sent via the interface of the network which is used for executing the encrypted multicast transmission.

Encryption of the multicast transmission may, in some scenarios, protect the integrity of a corresponding message—e.g., modification and/or replay of the message can be detected. In other scenarios, the encryption of the multicast transmission may, alternatively or additionally, prevent third parties not in possession of the corresponding cryptographic keying material from decrypting and reading the content of the message, i.e. the packetized data. Generally, it is not required that the entire message is encrypted; sometimes, only parts of the message including the packetized data may be encrypted.

The network may be a fixed-wire network or a wireless network. The network may combine radio transmission and fixed-wire transmission. Generally, the particular interface employed by the network for the encrypted multicast transmission is not limited. E.g., in some scenarios, the network may operate according to the Institute of Electrical and Electronics Engineers (IEEE) Wireless Local Area Network (WLAN) 802.11 protocol family, the Third Generation Partnership (3GPP) Technical Specification (TS) 22.368 Machine-Type Communication (MTC) protocol, Power Line Communication (PLC), etc.

Generally, the network may implement different functionality which may influence the capability of the various network nodes. E.g., it is possible that the various network nodes are associated with one or more of the following classes: sensors, controllers, and actuators. Typically, a sensor may provide an input to the controller, e.g., based on a physical observable. Examples of sensors include, in the framework of a use case directed to lighting control, presence detectors, motion detectors, brightness detectors, pushbuttons, light switches, microphones, etc. The controller may, according to a given application, control action of the actuator based on the input from the sensor. Examples of actuators include, in the framework of a use case directed to lighting control, dimmer, luminaire drivers, relays, etc. The functionality of the controller may be co-located with the sensor and/or the actuator.

By associating some of the network nodes having a given multicast IP address with the secret of the first cryptographic keying material and by associating others of the network nodes having the given multicast IP address with the different secret of the second cryptographic keying material, various effects may be achieved. E.g., it becomes possible to increase the level of security of the encrypted multicast transmission—while, at the same time, a flexibility in assigning of the multicast IP addresses may be preserved. Further, memory requirements may be reduced. In particular, it is possible to group a comparably large number of network nodes into the same multicast group, i.e., assign the same multicast IP address to a comparably large number of network nodes, thereby reducing the size of the multicast IP address space. At the same time, the security groups may be limited to a comparably small number of network nodes; i.e., the size of the first plurality of network nodes and the size of the second plurality of network nodes may be comparably limited.

In may be possible that the method further comprises associating a first subfraction of the first plurality of network nodes with a first application; and associating a second subfraction of the first plurality of network nodes with a second application. The first application may be different from the second application. It may then be possible to control the first subfraction of the first plurality of network nodes to add a first label to the packetized data indicating the first application when executing the encrypted multicast transmission; further, in may be possible to control the second subfraction of the first plurality of network nodes to add a second label to the packetized data indicating the second application when executing the encrypted multicast transmission.

E.g., it may be possible that the labels are added to a header section of the message which includes the packetized data as its payload. The label may serve as an indicator of the particular application to which the message belongs to.

Sometimes, the network nodes associated with the first subfraction may be referred to as a first application group; while the network nodes associated with the second subfraction may be referred to as a second application group. Hence, it may be possible to substructure security groups into application groups.

E.g., it is possible that an application group comprises all network nodes that have been configured by a commissioner to respond to events in a consistent manner.

E.g., as an example, in the framework of a use case directed to lighting control, a wall-mounted switch as a sensor and a set of luminaires in a single room as actuators might belong to a given application group. Here, the switch may be used to turn off/on all the luminaires in the group simultaneously with a single button press.

By providing the first subfraction and the second subfraction, i.e., by providing the application groups, it becomes possible to flexibly control execution of events independently of security constraints and routing constraints.

Generally, different network nodes may be flexibly assigned or associated with different security groups, multicast groups, and/or application groups. In some scenarios, it is possible to select, for a given network node, between various security groups, multicast groups, and/or application groups depending on a position of the given network node, e.g., in the framework of a use case directed to lighting control depending on a position with respect to a lighting scene. A lighting scene may relate to the environmental circumstances of lighting of a room or a set of rooms.

Referring to the application groups: In some scenarios, the first subfraction and the second subfraction may be overlapping, i.e., there may be network nodes which are associated with, both, the first subfraction and the second subfraction. In other scenarios, it is possible that the first subfraction and the second subfraction are disjoint or non-overlapping, i.e., there may be no network nodes that are associated with, both, the first subfraction and the second subfraction. E.g., where the first subfraction and the second subfraction are overlapping, it is possible that only network nodes that implement controller functionality are associated with, both, the first subfraction and the second subfraction; alternatively, it is possible that only network nodes that implement controller functionality or a sensor functionality are associated with, both, the first subfraction and the second subfraction.

Generally, it is possible that the label indicating the particular application group is encrypted using the secret of the corresponding cryptographic keying material of the security group; however, it is also possible that the label is not encrypted using the secret of the corresponding cryptographic keying material of the security group. E.g., the first subfraction of the first plurality of network nodes may be controlled to add, to the packetized data, the first label which is not encrypted based on the secret of the first cryptographic keying material when executing the encrypted multicast transmission. Likewise, it is possible that the second subfraction of the first plurality of network nodes is controlled to add, to the packetized data, the second label which is not encrypted based on the secret of the first cryptographic keying material when executing the encrypted multicast transmission.

In scenarios where the label is not encrypted, it is possible to reduce computational burden imposed by the receiving network nodes; e.g., those network nodes which are associated with a different application group than indicated by the label, but with the same security group, do not need to decode in order to find out that the packetized data of the message is irrelevant.

Referring again to the security groups: some scenarios, it is possible that the first plurality of network nodes and the second plurality of network nodes are non-overlapping. I.e., it is possible that there are no network nodes which are associated with, both, the first plurality of network nodes and the second plurality of network nodes. In other words, it may be possible that the first security group and the second security group—corresponding to the first plurality of network nodes in the second plurality of network nodes—do not share common network nodes.

Where the first plurality of network nodes in the second plurality of network nodes are non-overlapping, it is possible to increase a level of security. On the other hand, inter-security group communication typically needs to be handled via a central control unit that is in possession of, both, the first and second cryptographic keying material and/or master keying material. This may increase latency and a complexity of the network.

In a further scenario, it is possible that a third plurality of network nodes of the network is associated with a third cryptographic keying material. The third cryptographic keying material may have a different secret than the first cryptographic keying material and the second cryptographic keying material. It is then possible that the method further comprises controlling the third plurality of network nodes to execute encrypted transmission based on the secret of the third cryptographic keying material. Here, it is possible that the first plurality of network nodes and the third plurality of network notes nodes are overlapping. Further, it is possible that the second plurality of network nodes and the third plurality of network nodes are overlapping.

In such a scenario, it is possible that inter-security group communication between the first security group and the second security group is handled by the third security group—corresponding to the third plurality of network nodes. Then, it may be expendable to involve a central controller in the inter-security group communication.

Furthermore, in such a scenario it is possible to implement a hierarchy of security levels. E.g., while the first and second security groups may be associated at a lower level of hierarchy, it is possible that the third security group is associated with a higher level in the hierarchy. The network nodes of the third security group may instruct the network nodes of, both, the first and security groups—while the network nodes of the first and second security groups cannot instruct each other. As such, in terms of security, it may be desirable that a smaller number of network nodes is associated with the third plurality of network nodes if compared to the number of network nodes associated with the first plurality of network nodes and/or the second plurality of network nodes.

Furthermore, it may be desirable to limit the number of network nodes which are associated with, both, the first plurality of network nodes and the third plurality of network nodes, respectively with, both, the second plurality of network nodes and the third plurality of network nodes. In other words, it may be desirable to limit the overlap between the first plurality of network nodes and the third plurality of network nodes, respectively of the second plurality of network nodes and third plurality of network nodes. E.g., in some scenarios it is possible that only a single network node is part of, both, the first plurality of network nodes and the third plurality of network nodes; likewise, it is possible that in various scenarios only a single network node as part of, both, the second plurality of network nodes and the third plurality of network nodes. Thus, the overlap may be formed by a single network node.

Furthermore, it may be desirable to limit the types or class of network nodes which are associated with, both, the first plurality of network nodes and the third plurality of network nodes, respectively with, both, the second plurality of network nodes and a third plurality of network nodes. E.g., it may be possible that the overlap between the first plurality of network nodes in the third plurality of network nodes, respectively between the second plurality of network nodes in the third plurality of network nodes is limited to network nodes which implement controller functionality. In other scenarios, it is possible that the overlap is limited to network nodes which implement sensor functionality and/or network nodes which implement actuator functionality.

In other scenarios, it is also possible that the first plurality of network nodes and the second plurality of network nodes are overlapping. Hence, it is possible that there are one or more network nodes which are associated with, both, the first plurality of network nodes in the second plurality of network nodes. In such a scenario, it may be possible to implement inter-security group communication in a lean and efficient manner.

It may be desirable to limit the overlap between the first plurality of network nodes and the second plurality of network nodes to a comparably small number of network nodes. E.g., in some scenarios it is possible that only a single network node is associated with, both, the first plurality of network nodes in a second plurality of network nodes. Thus, the overlap may be formed by a single network node.

In further scenarios, it is possible that the overlap between the first plurality of network nodes in the second plurality of network nodes is limited to certain classes or types of network nodes. E.g., in some scenarios it is possible that the overlap between the first plurality of network nodes and the second plurality of network nodes is limited to network nodes which implement controller functionality. Alternatively or additionally, it is possible that the overlap between the first plurality of network nodes and the second plurality of network nodes is limited to network nodes which implement sensor functionality and/or network nodes which implement actuator functionality.

In some scenarios, it is possible that the packetized data is packetized application-layer data. Here, it is possible that said controlling of the first plurality of network nodes to execute the encrypted multicast transmission based on the first cryptographic keying material and the first multicast IP address comprises: controlling the first plurality of network nodes to encrypt and decrypt the packetized application-layer data using the secret of the first cryptographic keying material. Further, it is possible that said controlling of the second plurality of network nodes to execute encrypted multicast transmission based on the second cryptographic keying material in the first multicast IP address comprises: controlling the second plurality of network nodes to encrypt and decrypt packetized application-layer data using the secret of the second cryptographic keying material.

In such scenarios it is possible to implement the encryption/decryption based on the cryptographic keying material in a comparably high layer according to the Open Systems Interconnection (OSI) layered transmission protocol. Thereby, it is possible to separate and encapsulate cryptographic functionality from routing functionality—which, based on the multicast IP address, typically resides at lower layers of the OSI model.

It is possible that the method according to the presently discussed aspect further comprises, for a given one of the first plurality of network nodes: establishing a unique token associated with the first cryptographic keying material and the multicast IP address; a control unit of the network receiving, from the given one of the first plurality of network nodes, a request message including the unique token; in response to said receiving of the request message: the control unit retrieving, from a database, a cryptographic key to the secret of the first cryptographic keying material; and the control unit sending, to the given one of the first plurality of network nodes, a response message including the cryptographic key to the secret of the first cryptographic keying material.

The token may be network node-specific. Each network node may have an individual and unique token. Thereby, it is possible that a commissioner assigns different rights to the different network nodes that are identified by the corresponding tokens.

By means of the token, it is possible to pass the cryptographic keying material, as well as authorization information between the different parties of the network. To improve interoperability, the token format may be standardized. Different formats of the token are possible. One form it is that JSON web token. The token may comprise a further key; by means of the further key, message authentication can be employed in order to protect against forgery during token exchange. Capabilities—which are sometimes referred to as claims—can be included in the token and may state an access level and an associated application group of the corresponding network node. Another format of the token which may be implemented is the binary format employing Concise Binary Object Representation (CBOR) as defined in IETF RFC 7049.

By means of the token, it is possible to implement the cryptographic key to the secret of the cryptographic keying materials having a limited lifetime. E.g., the limited lifetime may specify a limited validity of the cryptographic key. Once the cryptographic key expires, by means of the token, new cryptographic keys can be distributed amongst the network nodes of the various security groups.

According to various aspects, a device is provided. The device comprises an interface configured to communicate with network nodes of a network. The device further comprises a database comprising an entry for each network node. The device further comprises at least one processor configured to associate the entry of each network node of a first plurality with a first cryptographic keying material and a multicast IP address. The at least one processor is further configured to associate the entry of each network node of a second plurality with a second cryptographic keying material and the multicast IP address. The at least one processor is configured to control, via the interface, the first plurality of network nodes to execute encrypted multicast transmission of packetized data based on the first cryptographic keying material and the multicast IP address. The at least one processor is further configured to control, via the interface, the second plurality of network nodes to execute encrypted multicast transmission of packetized data based on the second cryptographic keying material and the multicast IP address.

The device according to the presently discussed aspect can be configured to execute a method according to a further aspect of the present application.

For the device according to the presently discussed aspect, effects may be achieved which can be comparable to the effects that can be achieved by the method according to a further aspect of the present application.

According to an aspect, a computer program product is provided which comprises program code that can be executed by a processor. Execution of the program code causes the processor to execute a method comprising associating a first plurality of network nodes of a network with a first cryptographic keying material and a multicast IP address. The method further comprising associating a second plurality of network nodes of the network with a second cryptographic keying material and the multicast IP address. The first cryptographic keying material has a different secret than the second cryptographic keying material. The method further comprises controlling the first plurality of network nodes to execute encrypted multicast transmission of packetized data based on the secret of the first cryptographic keying material and the multicast IP address. The method further comprises controlling the second plurality of network nodes to execute encrypted multicast transmission of packetized data based on the secret of the second cryptographic keying material and the multicast IP address.

For the computer program product according to the presently discussed aspect, effects may be achieved which can be comparable to the effects that can be achieved by the method according to a further aspect of the present application.

According to an aspect, a method is provided. The method comprises a network node of a network receiving cryptographic keying material and a multicast IP address. The method further comprises the network node encrypting, based on a secret of the cryptographic keying material, packetized application-layer data. The method further comprises the network node sending, to further network nodes in a multicast transmission, a message including the encrypted packetized application-layer data based on the multicast IP address.

E.g. the method may further comprise the network node checking whether a valid key to the secret of the cryptographic keying material is available; and in response to said checking: selectively sending a request message to a control unit. The request message may include a unique token. The method may further comprise the network node receiving a response to message from the control unit, the response message including the valid key to the secret of the cryptographic keying material.

In some scenarios, it is possible that the network node sends the request message in response to a need of sending the packetized application-layer data.

According to an aspect, a network node of a network is provided. The network node comprises an interface configured to communicate with further network nodes. The network node further comprises at least one processor configured to receive cryptographic keying material and a multicast IP address. The at least one processor is configured to encrypt, based on a secret of the cryptographic keying material, packetized application-layer data. The at least one processor is configured to send, via the interface, a message including the encrypted packetized application-layer data in a multicast transmission to the further network nodes based on the multicast IP address.

The network node according to the presently discussed aspect can be configured to execute a method according to a further aspect of the present application.

For the network node according to the presently discussed aspect, effects may be achieved which can be comparable to the effects that can be achieved by the method according to a further aspect of the present application.

According to an aspect, a computer program product is provided which comprises program code that can be executed by a processor. Execution of the program code causes the processor to execute a method comprising a network node of a network receiving cryptographic keying material and a multicast IP address. The method further comprises the network node encrypting, based on a secret of the cryptographic keying material, packetized application-layer data. The method further comprises the network node sending, to further network nodes in a multicast transmission, a message including the encrypted packetized application-layer data based on the multicast IP address.

According to an aspect, a method is provided. The method comprises a network node of a network receiving cryptographic keying material and the multicast IP address. The method further comprises the network node receiving, from a further network node in the multicast transmission, a message including encrypted packetized application-layer data based on the multicast IP address. The method further comprises the network node decrypting, based on a secret of the cryptographic keying material, packetized application-layer data.

In case the further network node and the network node are not part of the same security group, it is possible that the decrypting of the packetized application-layer data fields.

In case the further network node in the network node are part of the same security group, it is possible that the decrypting of the packetized application-layer data is successful.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

The foregoing and additional features and effects of the invention will become apparent from the following detailed description when read in conjunction with the accompanying drawings, in which like reference numerals refer to like elements.

FIG. 1 schematically illustrates the architecture of a network comprising a plurality of network nodes that are configured to execute encrypted multicast transmission according to various embodiments, wherein FIG. 1 illustrates the architecture during a commissioning phase.

FIG. 2 schematically illustrates the architecture of a network comprising a plurality of network nodes that are configured to execute encrypted multicast transmission according to various embodiments, wherein FIG. 2 illustrates the architecture during an operational phase.

DETAILED DESCRIPTION OF THE EMBODIMENTS

Figure 1:
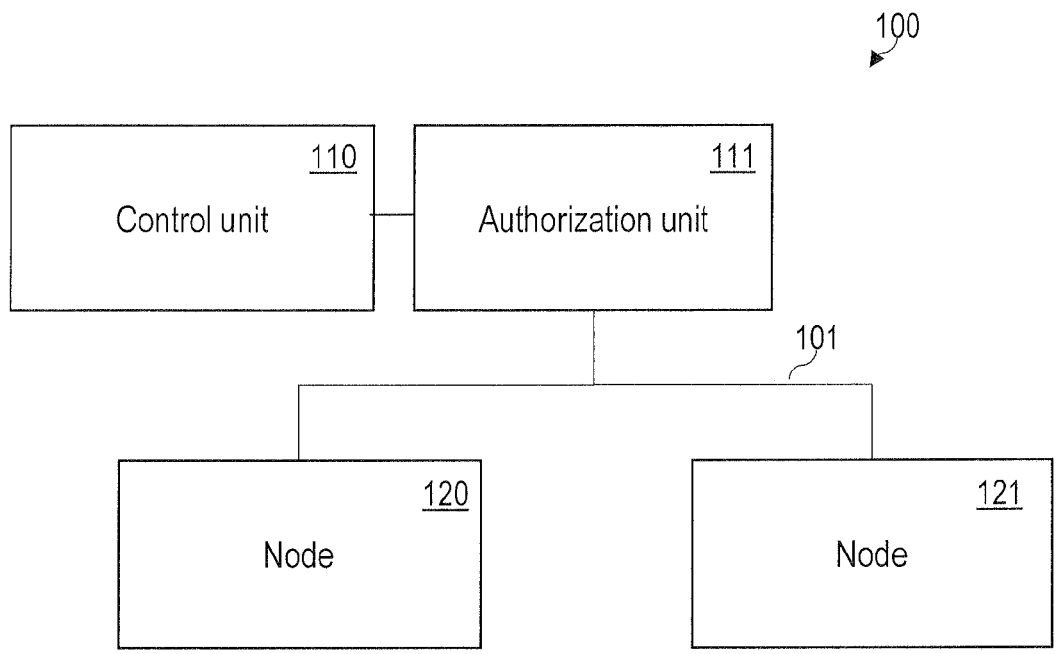

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, various techniques relating to secure multicast transmission in a network are discussed. In this regard, secure multicast transmission can relate to multicast transmission where messages such as datagrams or frames are at least partly encrypted using secrets that are shared between network nodes; cryptographic keying material is associated with the secrets. According to various embodiments, different network nodes may be associated with different cryptographic keying material. E.g., a first plurality of network nodes may be associated with a first cryptographic keying material and a second plurality of network nodes may be associated with a second cryptographic keying material; here, the first cryptographic keying material can have a different secret than the second cryptographic keying material.

Sometimes, those network nodes that share cryptographic keying material based on a given secret can be referred to as being associated with a given security group. E.g., a security group may comprise a set of sending and/or receiving network nodes, wherein each one of the sending network nodes of a given security group is able to securely send a message to all receiving network nodes of the given security group. On the other hand, as different security groups may rely on cryptographic keying material having different secrets, a network node not being associated with a given security group may not be able to decrypt messages secured with the cryptographic keying material of the given security group. Thereby, it is possible that messages may only be decrypted by those network nodes that are associated with the given security group.

E.g., in a scenario where a symmetric key is used as part of the cryptographic keying material to secure messages of a given security group, it may be assumed that every network node of the given security group has access to this symmetric key. By using symmetric keys, a latency of the encrypted multicast transmission can be reduced.

The multicast transmission in the network employs multicast IP addresses. The multicast IP address may identify a plurality of network nodes; as such, the plurality of network nodes can share the same multicast IP address. Sometimes, those network nodes that share a multicast IP address can be referred to as being associated with a given multicast group. A multicast group can comprise a set of all network nodes that subscribe to the same multicast IP address. There may be a single multicast IP group per network or a plurality of multicast IP addresses per network.

Multicast addressing and routing can be used in the Link Layer 804 (cf. FIG. 8), i.e., Layer 2 in the OSI, such as Ethernet multicast, and at the Internet or Network Layer 803 (cf. FIG. 8), i.e, Layer 3 for OSI for Internet Protocol Version 4 (IPv4) or Version 6 (IPv6) multicast.

By separating security aspects from routing aspects, a greater flexibility in the routing may be achieved—while, at the same time, a higher security may be implemented. Security groups can be made smaller and multicast groups can be made larger.

FIG. 1 schematically illustrates the architecture of a network 100 according to various embodiments; FIG. 1 illustrates the architecture during a commissioning phase. The network 100 of FIG. 1 comprises an authorization unit 111, two network nodes 120, 121, and a central control unit 110. In other scenarios, a larger number of network nodes 120, 121 may be connected to the network 100.

The central control unit 110 is configured to generate cryptographic keying material for the different network nodes 120, 121 to enable the secure multicast transmission. Further, the central control unit 110 is configured for distributing the cryptographic keying material to the network nodes 120, 121. In particular, the central control unit 110 can be configured to provide the cryptographic keying material depending on the particular security group to which a given network node 120, 121 is associated; to associate the various network nodes 120, 121 with a security group and/or a multicast IP address, each network node 120, 121 may be assigned a unique token. Further, the central control unit 110 is configured to rotate at least parts of the cryptographic keying material based on certain events, such as expiry of the lifetime of a cryptographic key or a change of the association of a network node 120, 121 with a security group.

The authorization unit 111 is configured to manage and store authorization information associated with the various network nodes 120, 121. E.g., the authorization information of the various network nodes 120, 121 can specify the particular role of the network nodes 120, 121 in the network 100. E.g., the authorization information can include associations of the various network nodes 120, 121 to different security groups and/or to different application groups. E.g., the authorization information can include associations of the various network nodes 120, 121 with one or more multicast IP addresses. E.g., the authorization information can include information on the position of the network nodes 120, 121. Further, it is possible that the authorization unit 111 is configured to perform authentication and authorization; this may be because access rights can be restricted to certain subscribers of the network 100. It is possible that the resource owners specifies the authorization policies that define which network node 120, 121 is allowed to perform which actions.

While generally, according to various embodiments, the range of actions that the various network nodes 120, 121 are allowed to perform can widely vary, the particular actions that the network nodes may perform can be based on a classification of the network nodes. A typical classification of the network nodes may correspond to: sensors, controllers, and actuators. E.g., sensors may detect a (physical) phenomenon like light, movement, or force. Examples of sensors include a light sensor, a presence sensor, and a pushbutton. Controllers may link an input e.g., received from a sensor—to an output; the output is for forwarding to an actuator. The controller may enforce a specific behavior which may be defined by an application. The actuator may cause an action as instructed by the control according to the application.

In typical applications, the output of a sensor might be used by more than one controller. A single controller might control a large number of actuators. A single actuator may be controlled by multiple controllers. Moreover, a single physical device might implement different functions; e.g., it is possible that a single physical device implements sensor functionality and controller functionality, etc.

It is possible that a plurality of network nodes are associated with a specific application—sometimes, those network nodes that are associated with the specific application are said to be part of an application group.

The authorization unit 111 can be implemented as a logical function. E.g., the authorization unit 111 can be implemented in a mobile device that can be carried by the commissioner and is only present during the commissioning phase. In other use cases, users using their smartphones to control network functionality may require the authorization unit 111 to dynamically execute access control decisions. FIG. 1 shows to commissioning phase where the network nodes 120, 121 obtain configuration information from the authorization unit 111 which includes a unique token associated with each network node. The token grants access to keys of cryptographic keying material and, as such, may include authorization claims for consumption by the central control unit 110. Examples are given by the IETF RFC 6749.

The token may be implemented as a bearer token or a proof-of-possession (PoP) token. By using a PpP token, flexibility can be achieved: with the use of symmetric key cryptography in the PoP token, a situation comparable to a Kerberos ticket can be implemented and when used with asymmetric cryptography it can play the role of a certificate. The bearer token concept is described in IETF RFC 6750 and the PoP token concept is described in the document "Proof-Of-Possession Semantics for JSON Web Tokens (JWTs)" by the OAuth Working Group of the IETF, by M. Jones et al., Mar. 9, 2015.

Generally, the token may be protected against modifications using a digital signature or message authentication code. The token can be verified by the central control unit 110. For securing message exchange between all involved parties of FIG. 1, it is possible to employ Datagram Transport Layer Security (DTLS).

Depending on the size of the network 100, it is possible that the authorization unit 111 and/or the central control unit 110 is only available during the commissioning phase—and not during an operational phase.

Figure 2:
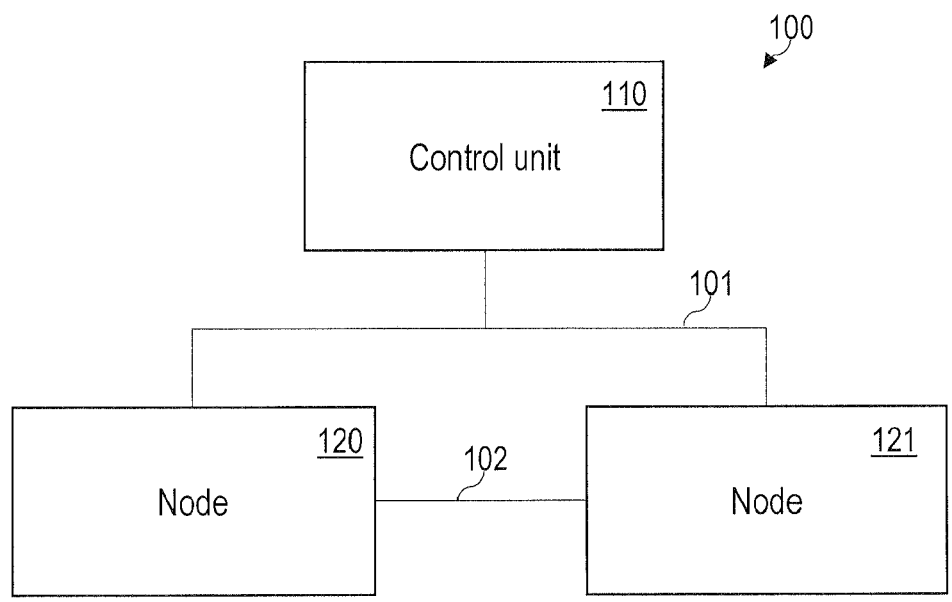

FIG. 2 illustrates the architecture of the network 100 during the operational phase. As can be seen from a comparison of FIGS. 1 and 2, it is not necessary that the authorization unit 111 is present during operational phase. E.g., one of the network nodes 120, 121, in the scenario FIG. 2, can be configured to request the key to a secret of cryptographic keying material. For this, request message may be sent from one of the nodes 120, 121 to the central control unit 110 which includes the token that has been previously provided to the node 120, 121 by the authorization unit 111 during the commissioning phase. The token may be used to authorize the request message. As part of a response message, the central control unit 110 can provide the key to the secret of the cryptographic keying material to the requesting network node 120, 121. Once the network node 120, 121 has successfully obtained the requested key, it can start executing the encrypted multicast transmission 102 with the other nodes 120, 121. In some scenarios, the key may be a symmetric key that is used to secure the multicast messages.

A receiving network node 120, 122 typically needs to perform two steps; first, the receiving network node 120, 121 needs to obtain the required key to the secret of the cryptographic keying material to decrypt and verify the incoming messages; second, the receiving network node 120, 121 requires information about what resource to sending network node 120, 121 is authorized to access. Both information, i.e., the key to the keying material, as well as information on the resources that the sending network node 120, 121 is authorized to access, can be included in the token provided by the authorization unit 111 to the receiving network node 120, 121.

Besides the encrypted multicast transmission 102 as illustrated above with respect to FIG. 2, it is also possible that the various network nodes 120, 121 of the network 100 execute encrypted unicast messaging. E.g., for encrypted unicast messaging, it is possible that the sending network node 120, 121 uses DTLS handshake to establish the necessary security context for securing subsequent unicast messages.

Figures 3, 4:
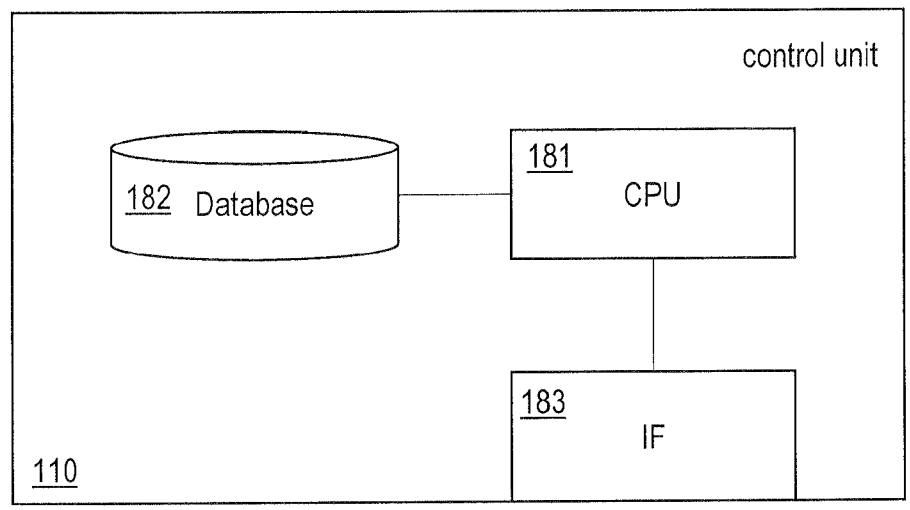
FIG. 3 schematically illustrates a control unit of the network according to FIGS. 1 and 2, wherein the control unit comprises a database comprising entries which associate network nodes of a first plurality with a first cryptographic keying material and a multicast IP address and further comprising entries which associate network nodes of a second plurality with a second cryptographic keying material and the multicast IP address, the first plurality of network nodes thereby implementing a first security group and the second plurality of network nodes implementing a second security group.
FIG. 4 schematically illustrates the entries of the database of FIG. 3 for five exemplary network nodes of the first and second security groups.

In FIG. 3, the central control unit 110 is schematically illustrated at greater detail. The central control unit 110 comprises a processor 181 which is coupled with the database 182. Further, the processor 182 is coupled with an interface 183. The interface 183 is configured to communicate with the network nodes 120, 121 of the network 120. The database 182 comprises an entry for each network node 120, 121. In particular, the processor 181 is configured to associate the entry of each network node 120, 121 of a first plurality with a first cryptographic keying material and the multicast IP address. The at least one processor 181 is further configured to associate the entry of each network node 120, 121 of the second plurality with a second cryptographic keying material and the multicast IP address. Hence, it is possible that by specifying the entries in the database 182 correspondingly, the security groups having cryptographic keying material with different secrets are implemented. However, the security groups can be part of the same multicast group as they share the same multicast IP address.

Then, the processor 181 is configured to control, via the interface 183, the first plurality of network nodes 120, 121 to execute the encrypted multicast transmission 102 of packetized data based on the first cryptographic keying material and the multicast IP address. The processor 181 is further configured to control, via the interface 183, the second plurality of network nodes 120, 121 to execute the encrypted multicast transmission 102 of packetized data based on the second cryptographic keying material and the multicast IP address. For this purpose, it is possible that the central control unit 110—e.g., in response to receiving a request message including the token—sends a response message to the corresponding network nodes 120, 121, said response message including the key to the secret of the corresponding cryptographic keying material.

In FIG. 4, the entries 191 of the database 182 illustrated for five network nodes 120-123, 130. In the scenario of FIG. 4, Gid labels the application group, Sid labels the security group, and IP labels the multicast IP address. The nodes 120-123 in the database 182 may be identified by corresponding unique tokens.

As can be seen from FIG. 4, the network node 120 is part of an application group 221, a security group 201, and a multicast group 200; the network node 121 is part of the application group 221, the security group 201, and the multicast group 200; the network node 122 is part of the application group 222, the security group 201, and the multicast group 200; the network node 123 as part of the application group 221 and further part of the application group 222, the security group 201, and the multicast group 200; and the network node 130 is part of the application group 231, the security group 202, and the multicast group 200. As can be seen from FIG. 4, all network nodes 120-123, 130 are part of the same multicast group, i.e., they all share the same multicast IP address. Generally, a single node 120-123, 130 may be part of more than a single security group or application group.

Figure 5A:
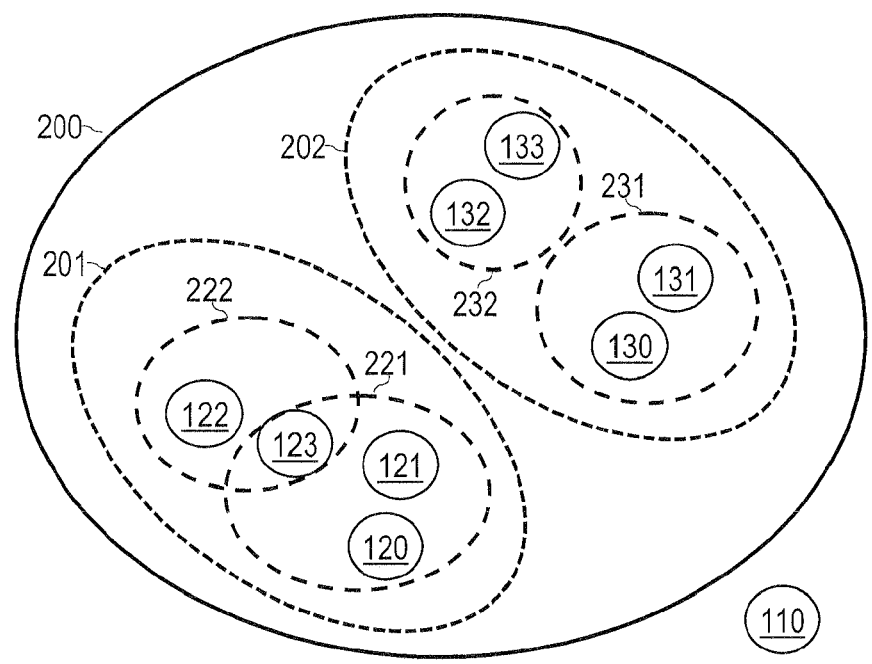
FIG. 5A is a Venn diagram of the first and second security groups, wherein the first security group comprises a first subfraction of network nodes associated with a first application and further comprises the second subfraction of network nodes associated with a second application, wherein the first subfraction thereby implements a first application group and wherein the second subfraction implements a second application group.

FIG. 5A is a Venn diagram of the scenario of FIG. 4. As can be seen from FIG. 5A, the security groups 201, 202 are non-overlapping, i.e., disjoint. Because the security groups 201, 202 are disjoint, it is not possible for a network node 120-123 of the security group 201 2 communicate with a network node 130-133 of the security group 202; this is because the secrets of the corresponding cryptographic keying materials are different.

Further, the application groups 231, 232 are disjoint. However, the application groups 221, 222 are overlapping. In particular, a single network node 123 is part of both application groups 221, 222. E.g., the single network node 123 could implement controller functionality.

As can be seen from FIG. 5A, the application groups 221, 222, 231, 232 are subfractions of the security groups 201, 202.

Hereinafter, various aspects with respect to associating of network elements 120-123, 130-133 to the different groups 200, 201, 202, 221, 222, 231, 233 are discussed with respect to lighting use cases for illustrative purposes. However, it should be appreciated that the various techniques as described herein are not limited to lighting use cases.

Figure 5B:
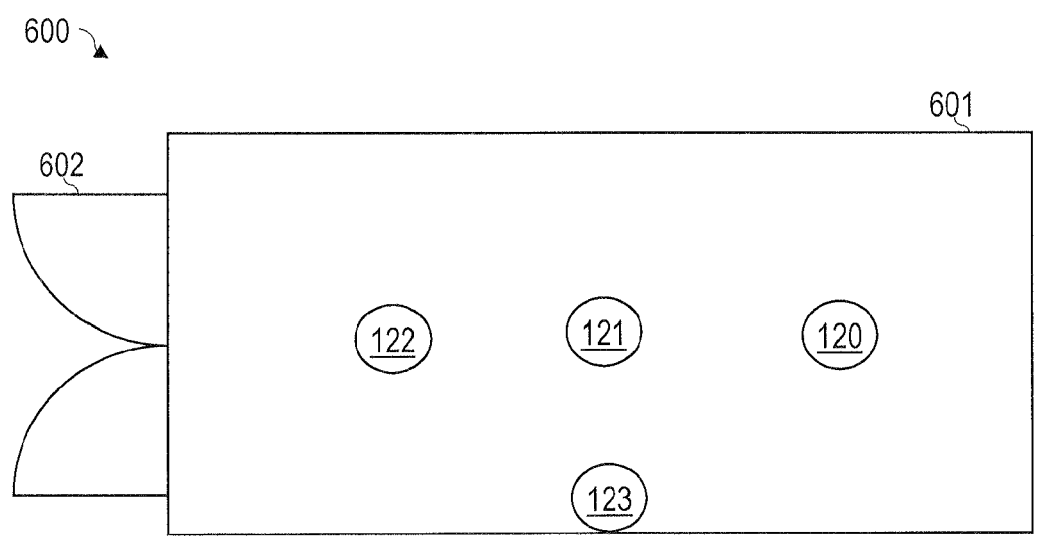
FIG. 5B illustrates the position of network nodes of the first security group of FIG. 5A in a lighting scene.

Generally, it is possible that the various network nodes 120-123, 130-133 are assigned to the different groups 200, 201, 202, 221, 222, 231, 232 depending on their functionality/classification and/or depending on the position with respect to the lighting scenes 600 (cf. FIG. 5B). In the scenario FIG. 5B, for the first security group 201, a scenario is shown where the network nodes 120-123 are all arranged within the room 601 which has windows 602 at one end. The two application groups 221, 222 correspond to "luminaires close to the window group" and "luminaires far from the window group"; i.e., the network nodes 120-122 have been assigned to the application groups 221, 222 depending on their position in the lighting scene 600. Despite the presence of two application groups 221, 222, all network nodes 120-123 are associated with the same multicast group 200 and share the same multicast IP address. Further, despite the presence of the two application groups 221, 222, all network nodes 120-123 are associated with the same security group 201.

It is possible that the network entities 130-133 of the security group 201 are positioned in a different room (not shown in FIG. 5B). Generally, it is possible that different security groups 201, 202 are defined for different rooms. In other scenarios, it is possible that different security groups 201, 202 are defined for different floors, rooms plus corridors, buildings, etc.

Figure 5C:
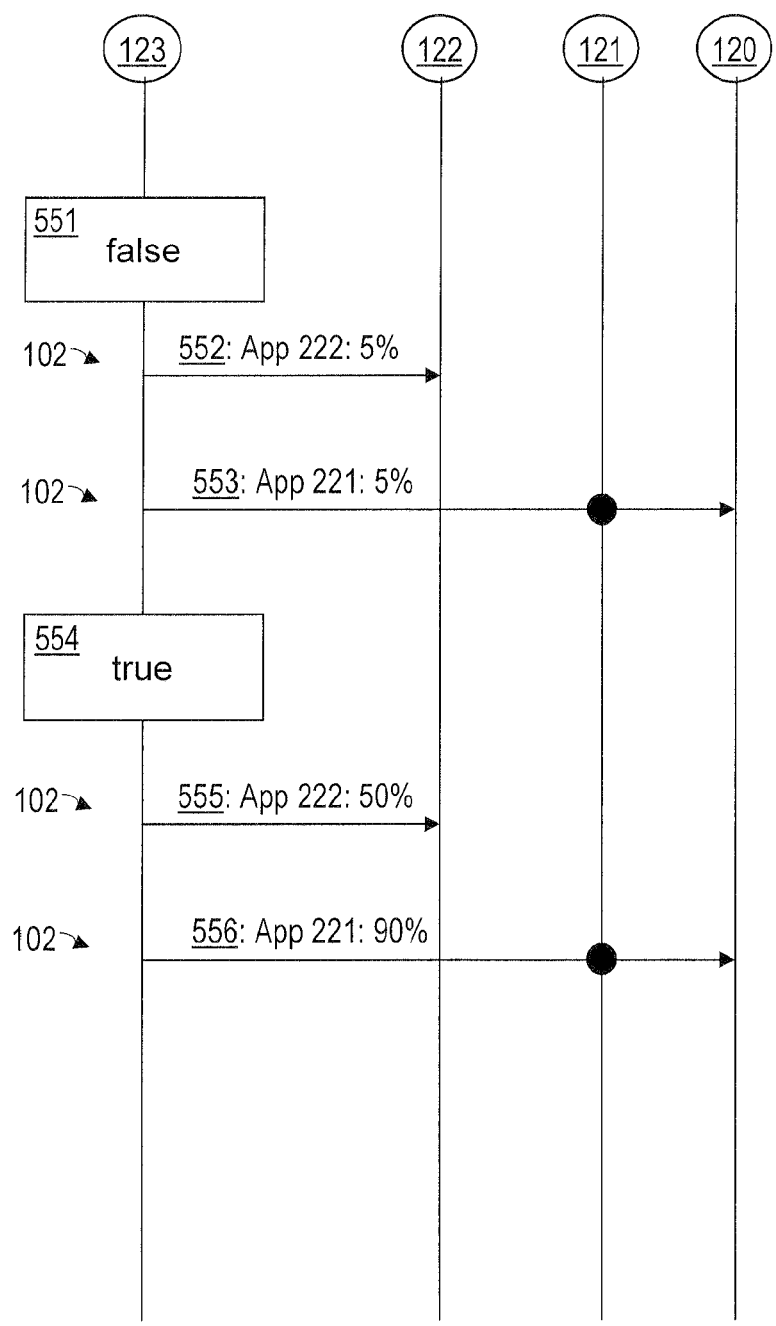
FIG. 5C is a signaling diagram illustrating a first application of the first application group and a second application of the second application group of FIG. 5A.

Turning to FIG. 5C, the applications associated with the application groups 221, 222 are explained in greater detail. Here it is assumed that the network node 123 implements sensor functionality and controller functionality; while the network nodes 120-122 implement actuator functionality and relate to luminaires. The network node 123 is a presence sensor.

At 551, the presence sensor 123 does not detect the presence of a person in the room 601. Because of this, the presence sensor 123 executes, at 552, encrypted multicast transmission 102 by sending a message that is at least partly encrypted with a symmetric key to the secret of the cryptographic keying material off the security group 201. The message is received by all network nodes 120-122. However, as the sensor 123 includes a label indicating the application group 222, only the luminaire 122 processes the corresponding message further (as indicated in FIG. 5C). The corresponding message includes packetized data which instructs the luminaire 122 to set a power level of 5%. Of all parts of the message, at least the packetized data is encrypted.

Further, the presence sensor 123 executes, at 553, encrypted multicast transmission 102 by sending a message that is encrypted with the symmetric key to the secret of the cryptographic keying material of the security group 201. The message is received by all network nodes 120-122. However, as the sensor 123 includes a label indicating the application group 221, only the luminaires 120, 121 process the corresponding message further (as indicated in FIG. 5C). The corresponding message includes packetized data which instructs the luminaire 120, 121 to set a power level of 5%. Of all parts of the message, at least the packetized data is encrypted.

At 554, the presence sensor 123 detects the presence of a person in the room 601. Then, at 555, a message is sent using the encrypted multicast transmission 102 which generally corresponds to the message 552, however, instructs the luminaire 122 to set a power level of 50%. At 556, a message is sent using the encrypted multicast transmission 102 which generally corresponds to the message 553, however, instructs the luminaires 120, 121 to set a power level of 90%.

Figure 6A:
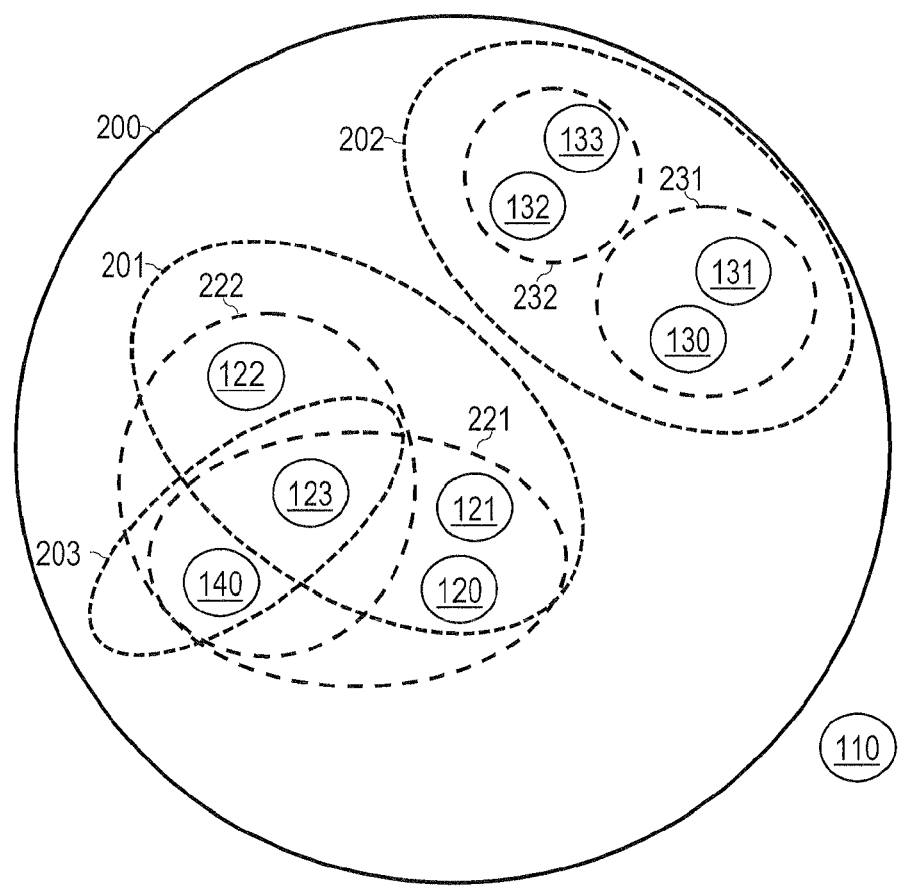
FIG. 6A generally corresponds to FIG. 5A, wherein a third security group overlaps with the first security group, wherein the network nodes of the third security group are associated with the first application group and the second application group.

FIG. 6A is a Venn diagram illustrates a scenario which generally corresponds to the scenario FIG. 5A; however, a further security group 203 comprising the network nodes 123, 140 is defined by including corresponding indicators in the database 182. The network nodes 123,140 are also part of the application groups 221, 222.

Figure 6B:
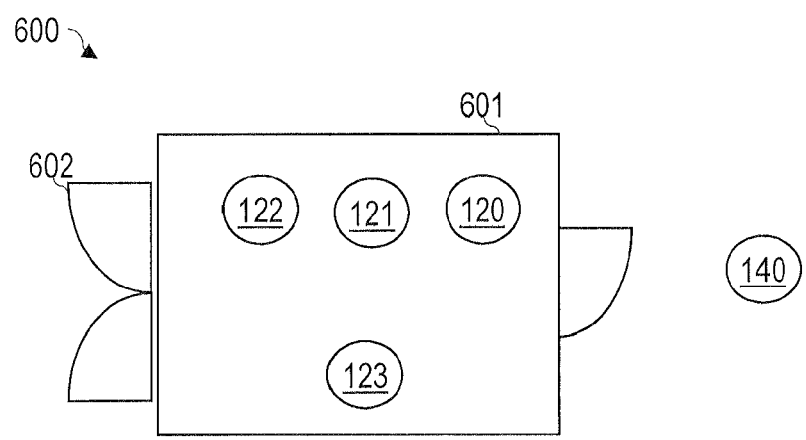
FIG. 6B illustrates the position of network nodes of the first and third security group of FIG. 6A in a lighting scene.

The scenario FIG. 6A corresponds to the lighting scenes 600 is illustrated in FIG. 6B. As can be seen, the lighting scenes 600 of FIG. 6B generally corresponds to the lighting scenes 600 of FIG. 5B. The network node 140—which implements a presence sensor—is located in the corridor which leads to the room 601.

Figure 6C:
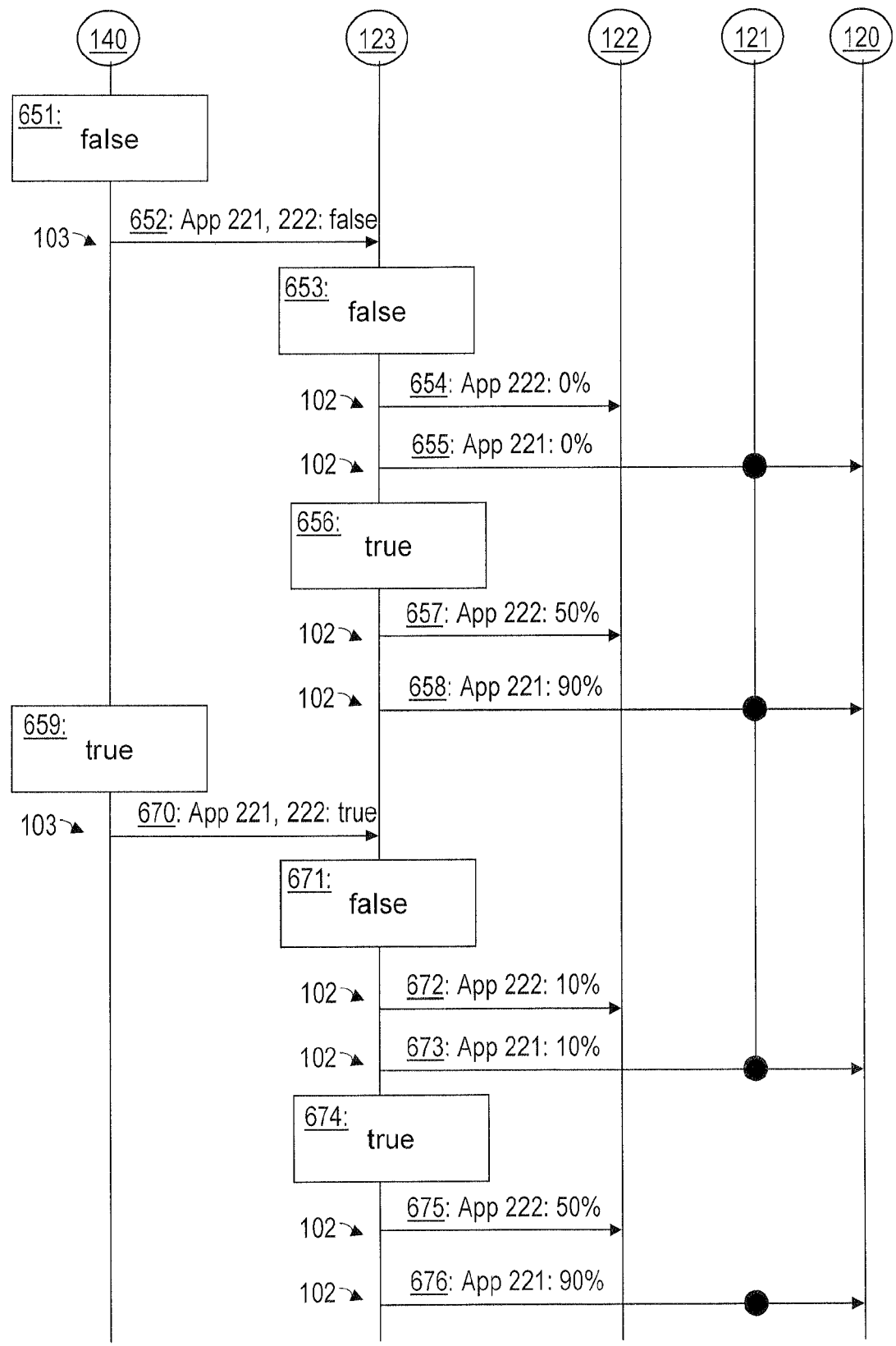
FIG. 6C is a signaling diagram illustrating a first application of the first application group and a second application of the second application group of FIG. 6A.

The applications associated with the application groups 221, 222 are defined by the following control functionality: first, if presence is detected in the room 601 by the presence sensors 123 (656, 674 in FIG. 6C), then the wall luminaires 120, 121 are set to a power level of 90% and the window luminaire 122 is set to a power level of 50% (657, 658, 675, 676 in FIG. 6C). Second, if no presence is detected in the room 601 by the presence sensor 123 and in the corridor by the presence sensor 140 (651 and 653 in FIG. 6C), then all the luminaires 120-122 of both application groups 221, 222 are turned off to 0% power level (654 and 655 in FIG. 6C). Third, if no presence is detected in the room 601 by the presence sensor 123, but presence is detected in the corridor by the presence sensor 140 (659 and 671 in FIG. 6C), then all the luminaires 120-122 of both application groups 221, 222 are set at a power level of 5% (672 and 673 in FIG. 6C).

In the scenario of FIG. 6C, the presence sensor/controller 140 uses unicast messaging 103 to communicate with the presence sensor/controller 123 in the room 601. Once the presence sensor/controller 123 receives the corresponding message 652, 670, it sends messages 654, 655, 657, 658, 672, 673, 675, 676 using encrypted multicast transmission 102 to all luminaires 120-122 in the room 601.

Due to setting up of the security groups 201, 203, the presence sensor 140 located in the corridor is not able to communicate directly with the luminaires 120-122 in the room 601. A hierarchy of security groups 201, 203 is achieved.

While, in the scenario of FIG. 6C, the network nodes 123, 140 of the security group 203 execute unicast transmission 103, in other scenarios it is also possible that the network nodes 123, 140 of the security group 203 execute encrypted multicast transmission 102. Generally, it is also possible that the unicast transmission 103 is encrypted.

Figure 7:
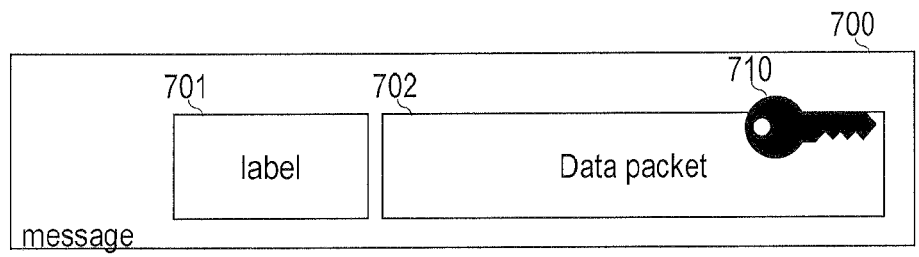
FIG. 7 schematically illustrates a message including an unencrypted label indicative of the application group and an encrypted application-layer data packet.

In FIG. 7, a message 700 of encrypted multicast transmission 102 is illustrated. The message includes an application-layer 801 data packet 702 which is encrypted using a key 710 to the secret of the cryptographic keying material of the security group of the corresponding sending network node 120-123, 130-133, 140. The message 700 further includes a label 701 which identifies the application group of the corresponding sending network node 120-123, 130-133, 140. In the scenario of FIG. 7, the label 701 is not encrypted using the key 710. In other scenarios, it is possible that the label 701 is also encrypted using the key 710.

Figure 8:
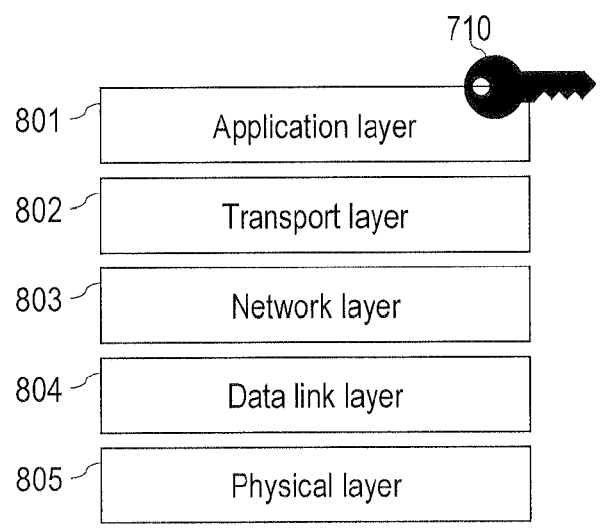
FIG. 8 illustrates multiple layers, including the application layer, of a layered transmission protocol.

FIG. 8 illustrates the layered OSI model. The encryption/decryption using the key 710 occurs at the application layer 801. The lower layers 802-805 are used for transmission employing the multicast IP address. Thus encryption/decryption functionality and routing functionality is encapsulated and separated.

Figure 9:
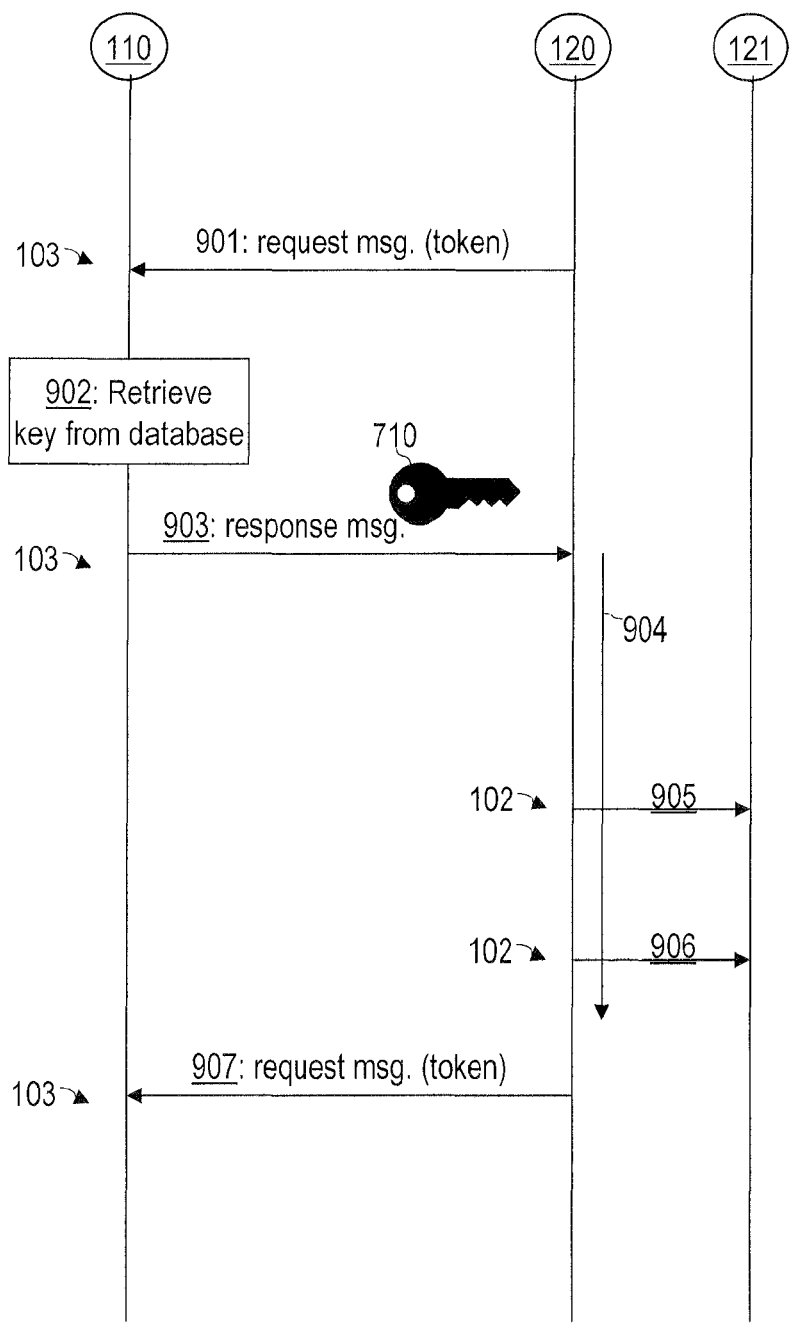
FIG. 9 illustrates the distribution of keys to the secret of cryptographic keying material depending on unique tokens.

FIG. 9 is a signaling diagram which illustrates distribution of the key 710 to the secret of the cryptographic keying material. A request message 901 which includes a unique token is sent by the network node 120 and received by the central control unit 110. E.g., in the scenario of FIG. 9, the token may be formatted as JSON web token.

In the scenario of FIG. 9, the request message 901 a sent using encrypted unicast transmission 103; in other scenarios, it is also possible to send the request message 901 employing the encrypted multicast transmission 102.

Based on the unique token, at 902, the central control unit 110 retrieves an up-to-date key 710 from the database 182. Then, the central control unit 110 sends a response message 903 which includes the cryptographic key 701.

In the scenario of FIG. 9, the response message 903 is sent using encrypted unicast transmission 103; in other scenarios, it is possible to send the response message 903 employing the encrypted multicast transmission 102.

In the scenario of FIG. 9, the cryptographic key 710 has a limited lifetime 904. During the lifetime 904, the network node 120 executes the encrypted multicast transmission 102 based on the key 710 (905, 906). In response to the network node 120 detecting expiry of the lifetime 904 of the key 710, a new request message 907 is sent to the central control unit 110.

Some further aspects with respect to FIG. 9 are illustrated hereinafter.

Due to the desired low latency, typically verification of the token needs to be done locally and cannot be outsourced to other parties. For this reason, self-contained tokens should be used and receiver nodes should follow the steps outlined, e.g., in section 7.2 of IETF RFC 7519. This includes verification of the message authentication code protecting the contents of the token and the encryption envelope protecting the contained symmetric group key.

Tokens typically also may have a specified lifetime. Setting the lifetime may be a policy decision that involves making a trade-off decision. Allowing a longer lifetime increases the need to introduce mechanisms for token revocation—e.g., in the form of real-time signaling from the central control unit 110 and/or the authorization unit 111 to the network nodes to blacklist a given token; at the same time, it lowers the communication overhead during normal operation since new tokens need to be obtained only from time to time. Real-time communication with the receivers to revoke tokens may not be possible in all cases either, particularly when off-line operation is demanded or in small networks where the application unit 111 and/or the central control unit 110 are only present during commissioning phase.

Therefore, in various scenarios, short-lived tokens can be preferred for dynamic use cases like users accessing the network 100 using smartphones, tablets, and the like to avoid potential security problems when tokens are leaked or where authorization rights are revoked. If network nodes that are statically mounted—as can be the case for conventional light switches and/or luminaires—it is possible to use a longer token lifetime since reconfiguration of the token leakage is less likely to happen frequently.

To limit the authorization rights, tokens should contain an audience restriction, scoping their use to the intended receiving network nodes to their access level.

Sending and receiving network nodes are not necessarily equipped with real-time clocks. However, it is possible to implement communication between the network nodes and a time server. Where accurate clocks are not available, it is possible that clock drifts and limited ability to check for replays is encountered. For those scenarios where no time servers available, e.g., as in small network installations, token verification typically is not able to check for expired tokens and hence it might be necessary to fall back to tokens that do not expire.

Generally, network nodes in lighting systems can be often powered down intentionally or unintentionally. Therefore, network nodes may be required to store the tokens—e.g., along with the replay context—in persistence storage like flash memory. This may be especially required if the authorization unit 111 is not online after the commissioning phase (cf. FIG. 1). However, storing data in the memory of the network nodes can be a trade-off between how soon the network nodes can be back online to normal operational mode and the memory wear caused due to the program-erase cycles of flash memory over 15-20 years lifetime of the device.

Similar considerations as have been explained above with respect to tokens can also be applied to the lifetime 904 of the key 710.

Figure 10:
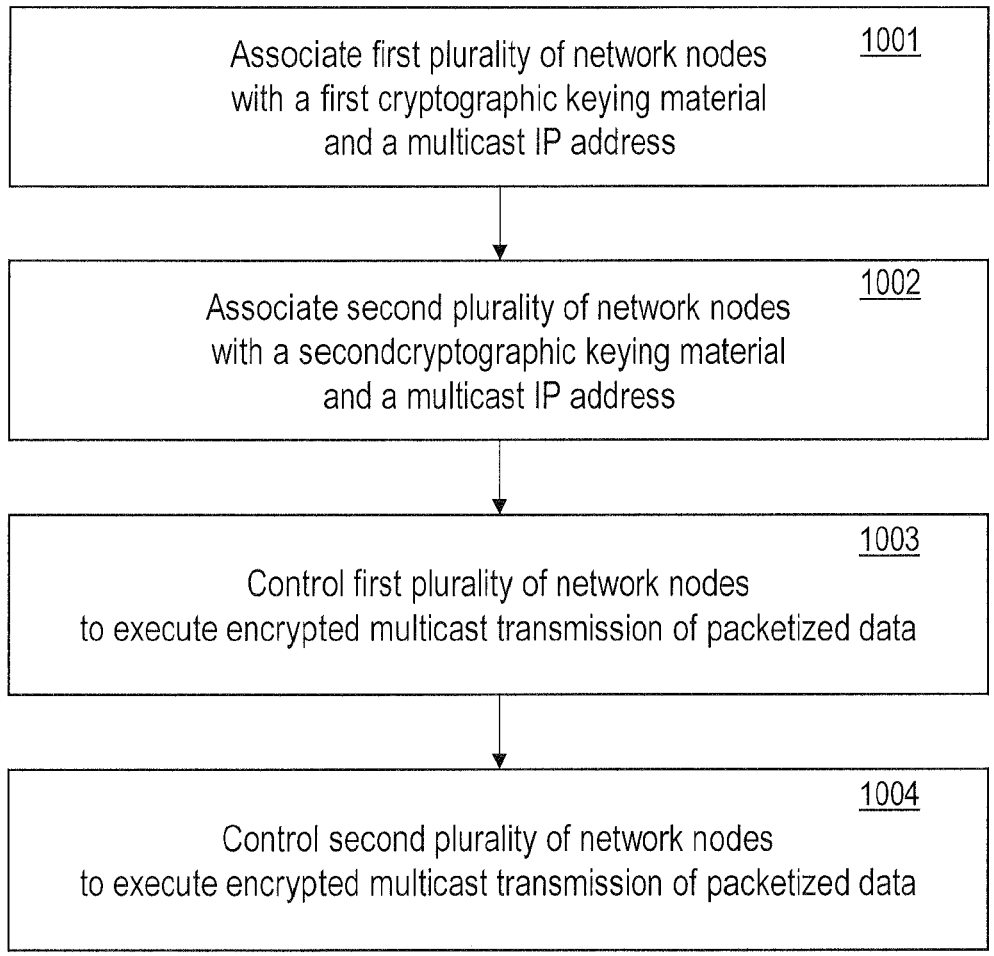
FIG. 10 is a flowchart of a method according to various embodiments.

FIG. 10 is a flowchart of a method according to various embodiments. The method of FIG. 10 may be executed by the central control unit 110 and/or the application unit 111.

At 1001, a first plurality of network nodes is associated with a first cryptographic keying material and the multicast IP address. Said associating may be implemented by setting the entries 191 of the database 182. The cryptographic keying material may include one or more cryptographic keys 710, e.g., a single symmetric key 710 and/or a plurality of public and private keys.

At 1002, a second plurality of network nodes is associated with a second cryptographic keying material and the multicast IP address. Thus, the first plurality of network nodes in the second plurality of network nodes share the same multicast IP address, but are associated with different cryptographic keying material. The first cryptographic keying material and the second cryptographic keying material have different secrets; thus, a network node which is only in possession of one of the two cryptographic keying materials cannot decode packetized data which has been encrypted using the secret of the other one of the two cryptographic keying materials.

At 1003, the first plurality of network nodes is controlled to execute the encrypted multicast transmission 102 of the packetized data. At 1004, the second plurality of network nodes is controlled to execute the encrypted multicast transmission 102 of the packetized data 702. As part of 1003 and 1004, it is possible to send and/or receive control messages—such as the request message 901, 907 and the response message 903.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

E.g., while above various aspects and embodiments have been discussed with respect to lighting use cases, general, the various techniques as described herein can be readily applied to different use cases. Other use cases may include machine-type communication in assembly lines, etc.

What is claimed is:

1. A method for controlling encrypted multicast transmission of packetized data in a network, comprising:
    associating, with a control unit of the network, a first plurality of network nodes of the network with a first cryptographic keying material and a multicast Internet Protocol (IP) address,
    associating, with the control unit, a second plurality of network nodes of the network with a second cryptographic keying material and the multicast IP address, wherein the first plurality of network nodes and the second plurality of network nodes share the multicast IP address, the first cryptographic keying material having a first secret and the second cryptographic keying material having a second secret that is different from the first secret,
    controlling, with the control unit, the first plurality of network nodes to execute encrypted multicast transmission of first packetized data based on the first secret of the first cryptographic keying material and the multicast IP address, wherein the first packetized data is encrypted using the first secret of the first cryptographic keying material to obtain encrypted first packetized data and the encrypted first packetized data can only be decrypted by the first plurality of network nodes,
    controlling, with the control unit, the second plurality of network nodes to execute encrypted multicast transmission of second packetized data based on the second secret of the second cryptographic keying material and the multicast IP address, wherein the second packetized data is encrypted using the second secret of the second cryptographic keying material to obtain encrypted second packetized data and the encrypted second packetized data can only be decrypted by the second plurality of network nodes,
    wherein the associating the first plurality of network nodes further comprises associating a first subfraction of nodes of the first plurality of network nodes with a first functionality and associating a second subfraction of nodes of the first plurality of network nodes with a second functionality that is different from the first functionality,
    wherein the execute the encrypted multicast transmission of the first packetized data further comprises in response to receiving a first message that includes the encrypted first packetized data and a first label indicating the first functionality, processing the first message only by the first subfraction of nodes of the first plurality of network nodes, and in response to receiving a second message that includes the encrypted first packetized data and a second label indicating the second functionality, processing the second message only by the second subfraction of nodes of the first plurality of network nodes.

2. The method of claim 1, wherein the first subfraction of nodes of the first plurality of network nodes is controlled to add, to the encrypted first packetized data, the first label which is not encrypted based on the first secret of the first cryptographic keying material when executing the encrypted multicast transmission of the first packetized data, wherein the second subfraction of nodes of the first plurality of network nodes is controlled to add, to the encrypted first packetized data, the second label which is not encrypted based on the first secret of the first cryptographic keying material when executing the encrypted multicast transmission of the first packetized data.

3. The method of claim 1, wherein the first plurality of network nodes and the second plurality of network nodes are non-overlapping.

4. The method of claim 3, further comprising:
    associating a third plurality of network nodes of the network with a third cryptographic keying material, the third cryptographic keying material having a third secret different from the first secret of the first cryptographic keying material and the second secret of the second cryptographic keying material,
    controlling the third plurality of network nodes to execute encrypted transmission based on the third secret of the third cryptographic keying material, wherein the first plurality of network nodes and the third plurality of network nodes are overlapping, wherein the second plurality of network nodes and the third plurality of network nodes are overlapping.

5. The method of claim 1, wherein the first plurality of network nodes and the second plurality of network nodes are overlapping.

6. The method of claim 1, wherein the first packetized data is a first packetized application-layer data and the second packetized data is a second packetized application-layer data,
    wherein said controlling of the first plurality of network nodes to execute the encrypted multicast transmission of the first packetized data based on the first secret of the first cryptographic keying material and the multicast IP address comprises: controlling the first plurality of network nodes to encrypt the first packetized application-layer data to obtain encrypted first packetized application-layer data and decrypt the encrypted first packetized application-layer data using the first secret of the first cryptographic keying material, and
    wherein said controlling of the second plurality of network nodes to execute the encrypted multicast transmission of the second packetized data based on the second secret of the second cryptographic keying material and the multicast IP address comprises: controlling the second plurality of network nodes to encrypt the second packetized application-layer data to obtain encrypted second packetized application-layer data and decrypt the encrypted second packetized application-layer data using the second secret of the second cryptographic keying material.

7. The method of claim 1, further comprising for a given one of the first plurality of network nodes:
    establishing a unique token associated with the first cryptographic keying material and the multicast IP address,
    receiving, by the control unit from the given one of the first plurality of network nodes, a request message including the unique token,
    in response to receiving the request message: retrieving, by the control unit from a database, a cryptographic key to the first secret of the first cryptographic keying material,
    sending, by the control unit to the given one of the first plurality of network nodes, a response message including the cryptographic key to the first secret of the first cryptographic keying material.

8. The method of claim 7, wherein the unique token is formatted as a JavaScript Object Notation (JSON) web token.

9. The method of claim 7, wherein the cryptographic key has a limited lifetime.

10. The method of claim 1, further comprising:
sending, by the control unit to each one of the first plurality of network nodes, a control message including a first symmetric cryptographic key to the first secret of the first cryptographic keying material,
sending, by the control unit to each one of the second plurality of network nodes, a further control message including a second symmetric cryptographic key to the second secret of the second cryptographic keying material.

11. The method of claim 1, wherein the first plurality of network nodes and the second plurality of network nodes are selected from a group comprising: a sensor, a controller, and a actuator.

12. The method of claim 1, further comprising:
for a given network node: selecting between the first plurality of network nodes and the second plurality of network nodes depending on a position of the given network node in a lighting scene.

13. A control unit for controlling encrypted multicast transmission of packetized data in a network, comprising:
an interface for communicating with network nodes of the network,
a database comprising an entry for each network node of the network nodes of the network, and
at least one hardware processor that executes program code and is configured to associate a first plurality of network nodes of the network nodes of the network with a first cryptographic keying material and a multicast Internet Protocol (IP) address,
wherein the at least one hardware processor is further configured to associate a second plurality of network nodes of the network nodes of the network with a second cryptographic keying material and the multicast IP address, wherein the first plurality of network nodes and the second plurality of network nodes share the multicast IP address, said first cryptographic keying material having a first secret and said second cryptographic keying material having a second secret that is different from said first secret,
wherein the at least one hardware processor is configured to control, via the interface, the first plurality of network nodes to execute encrypted multicast transmission of first packetized data based on the first secret of the first cryptographic keying material and the multicast IP address, wherein the first packetized data is encrypted using the first secret of the first cryptographic keying material to obtain encrypted first packetized data and the encrypted first packetized data can only be decrypted by the first plurality of network nodes,
wherein the at least one hardware processor is configured to control, via the interface, the second plurality of network nodes to execute encrypted multicast transmission of second packetized data based on the second secret of the second cryptographic keying material and the multicast IP address, wherein the second packetized data is encrypted using the second secret of the second cryptographic keying material to obtain encrypted second packetized data and the encrypted second packetized data can only be decrypted by the second plurality of network nodes,
wherein the associate the first plurality of network nodes further comprises associating a first subfraction of nodes of the first plurality of network nodes with a first functionality and associating a second subfraction of nodes of the first plurality of network nodes with a second functionality that is different from the first functionality,
wherein the execute the encrypted multicast transmission of the first packetized data further comprises in response to receiving a first message that includes the encrypted first packetized data and a first label indicating the first functionality, processing the first message only by the first subfraction of nodes of the first plurality of network nodes, and in response to receiving a second message that includes the encrypted first packetized data and a second label indicating the second functionality, processing the second message only by the second subfraction of nodes of the first plurality of network nodes.

\* \* \* \* \*